United States Patent
Wang et al.

(10) Patent No.: US 11,557,319 B1
(45) Date of Patent: Jan. 17, 2023

(54) READ OFFSET CALIBRATION FOR ERROR RECOVERY

(71) Applicant: Seagate Technology LLC, Fremont, CA (US)

(72) Inventors: Zheng Wang, Louisville, CO (US); Ara Patapoutian, Hopkinton, MA (US); Jason Bellorado, San Jose, CA (US); William M. Radich, Berthoud, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/410,840

(22) Filed: Aug. 24, 2021

(51) Int. Cl.
  *G11B 5/596* (2006.01)
  *G11B 20/18* (2006.01)
  *G11B 20/12* (2006.01)

(52) U.S. Cl.
  CPC ...... *G11B 5/59627* (2013.01); *G11B 5/59655* (2013.01); *G11B 20/1258* (2013.01); *G11B 20/1816* (2013.01); *G11B 20/1876* (2013.01); *G11B 2020/1281* (2013.01); *G11B 2020/183* (2013.01)

(58) Field of Classification Search
  None
  See application file for complete search history.

(56) References Cited

U.S. PATENT DOCUMENTS

| | | | |
|---|---|---|---|
| 4,589,037 A | 5/1986 | Jen et al. | |
| 5,055,951 A | 10/1991 | Behr | |
| 5,383,071 A | 1/1995 | Sato | |
| 5,450,257 A * | 9/1995 | Tran | G11B 5/56 |
| 5,831,888 A | 11/1998 | Glover | |
| 5,930,211 A * | 7/1999 | Sasaki | G11B 7/08541 369/53.28 |
| 5,949,602 A | 9/1999 | Ishioka et al. | |
| 6,108,153 A | 8/2000 | Glover | |
| 6,154,335 A | 11/2000 | Smith et al. | |
| 6,317,285 B1 | 11/2001 | Bi et al. | |
| 6,429,994 B1 | 8/2002 | Le et al. | |
| 6,430,008 B1 * | 8/2002 | Trabert | G11B 5/584 |
| 6,515,818 B1 | 2/2003 | Harmer | |
| 6,567,489 B1 | 5/2003 | Glover | |
| 6,657,809 B2 | 12/2003 | Ottesen et al. | |
| 6,657,810 B1 * | 12/2003 | Kupferman | G11B 5/59627 360/77.04 |
| 7,245,449 B2 | 7/2007 | Stein et al. | |
| 7,307,808 B2 | 12/2007 | Kaizu et al. | |
| 7,885,025 B2 | 2/2011 | Eppler et al. | |
| 8,149,529 B2 | 4/2012 | Mathew et al. | |

(Continued)

OTHER PUBLICATIONS

"Volterra series," Wikipedia, retrieved from "https://en.wikipedia.org/w/index.php?title=Volterra_series&oldid=1022344532," edited on May 10, 2021.

*Primary Examiner* — Peter Vincent Agustin
(74) *Attorney, Agent, or Firm* — Faegre Drinker Biddle & Reath (57) ABSTRACT

A hard disk drive includes a magnetic recording medium comprising data sectors along a data track, a read head arranged to read data from the data sectors, and an integrated circuit. The integrated circuit includes circuitry programmed to detect a read error associated with a first of the data sectors and continue to read data from the data sectors after the detection of the read error.

20 Claims, 11 Drawing Sheets

(56) References Cited

U.S. PATENT DOCUMENTS

| | | | |
|---|---|---|---|
| 8,917,475 B1* | 12/2014 | Zhao | G11B 5/59616 |
| | | | 360/75 |
| 8,964,325 B1* | 2/2015 | Yamada | G11B 5/59627 |
| | | | 360/75 |
| 9,001,452 B2 | 4/2015 | Daugela et al. | |
| 9,019,642 B1 | 4/2015 | Xia et al. | |
| 9,190,078 B2 | 11/2015 | Sapozhnikov et al. | |
| 9,819,456 B1 | 11/2017 | Bellorado et al. | |
| 9,953,673 B2 | 4/2018 | Daugela et al. | |
| 10,008,229 B2 | 6/2018 | Galbraith et al. | |
| 10,020,017 B2 | 7/2018 | Furuhashi | |
| 10,255,943 B1 | 4/2019 | Schick et al. | |
| 2002/0181347 A1* | 12/2002 | Ikeda | G11B 7/094 |
| | | | 369/30.16 |
| 2006/0126460 A1 | 6/2006 | Kobayashi | |
| 2009/0168224 A1 | 7/2009 | Sakai | |
| 2009/0257333 A1* | 10/2009 | Kikuchi | G11B 20/10203 |
| 2010/0097714 A1* | 4/2010 | Eppler | G11B 20/10425 |
| | | | 360/39 |
| 2017/0061997 A1 | 3/2017 | Furuhashi | |
| 2017/0194024 A1 | 7/2017 | Galbraith et al. | |

* cited by examiner

READ OFFSET CALIBRATION FOR ERROR RECOVERY

SUMMARY

In certain embodiments, a method includes determining an error in reading a data sector in a data track, calculating a position error signal, and determining an estimated read offset value of the data sector based, at least in part, on the calculated position error signal.

In certain embodiments, a hard disk drive includes a magnetic recording medium comprising data sectors along a data track, a read head arranged to read data from the data sectors, and an integrated circuit. The integrated circuit includes circuitry programmed to: detect a read error associated with a first of the data sectors and, after the detection of the read error, continue to read data from the data sectors.

In certain embodiments, a system-on-a-chip includes a read/write channel configured to: calculate read offset proxy values for each data sector, detect an error is reading a first data sector of the data sectors, calculate a reference value for the data track, and compare the reference value to the read offset proxy value associated with the first data sector. The system-on-a-chip also includes a servo controller configured to cause adjustment of a position of a read head in response to the comparison.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

When hard disk drives are initially unable to successfully read data from data sectors on a magnetic recording medium, hard disk drives identify the error and try to read the missed data sectors again. This process of identifying the error and then re-reading the missed data sectors is sometimes called error recovery. Re-reading the missed data sectors can be challenging because one common cause for missing data sectors is that the missed data sectors may be misaligned or offset from the center of the data track. As such, following the same path along the center of the data track may result in missing the same data sectors again. Certain embodiments of the present disclosure are accordingly directed to methods and devices for error recovery.

Figure 1:
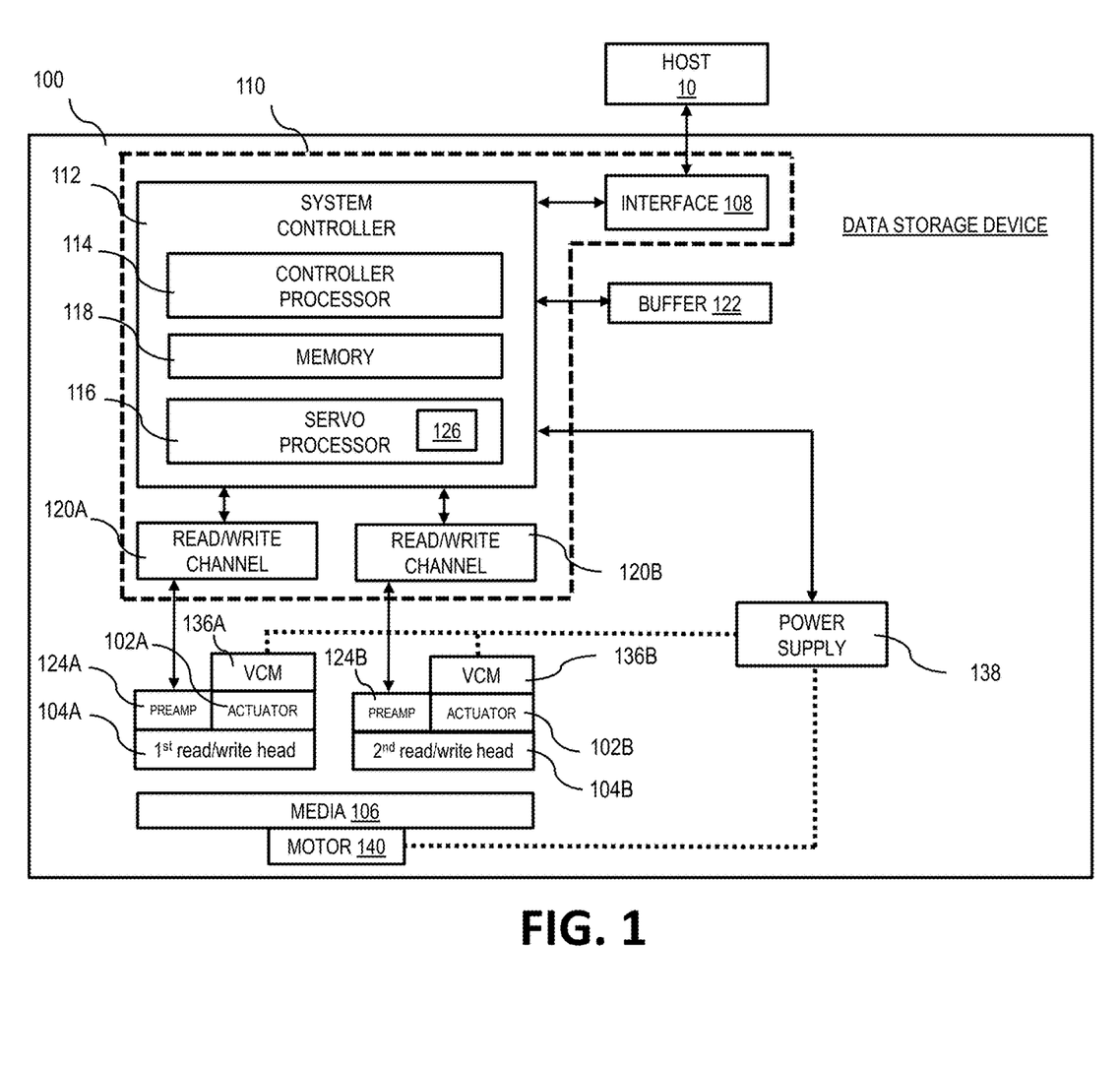
FIG. 1 shows a block diagram of a data storage device, in accordance with certain embodiments of the present disclosure.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator. The read/write heads 104A and 104B can each comprise a slider with one or more read transducers (e.g., readers, read head) and one or more write transducers (e.g., writers, write head).

The data storage device 100 includes an interface 108 (e.g., an input/output interface) for transferring data to and from the data storage device 100. For example, the interface 108, among other features, can be communicatively coupled between a host 10 (e.g., a laptop, a personal computer, or a data storage system such as a server) and the read/write heads 104A and 104B to facilitate communication, using a standardized communication protocol (e.g., SATA, SAS, SCSI), between the read/write heads 104A and 104B and the host 10.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller 126). The interface 108 may also be part of the SOC 110.

The SOC 110 can also include one or more read/write channels 120A and 120B, which encode and decode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 10. Data associated with a write command may be received from the host 10 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106, processed by one of the read/write channels 120A or 120B, and stored in the buffer 122. Such data is then transferred to the host 10 by the interface 108. In certain embodiments, the servo processor 116 controls operations of respective pre-amplifiers 124A and 124B, which provide signals to the respective read/write heads 104A and 104B for writing magnetic transitions to the magnetic recording media 106 and for receiving signals from the respective read/write heads 104A and 104B in response to detecting magnetic transitions written to the magnetic recording media 106.

The data storage device 100 includes a servo control system 126 (schematically shown in more detail in FIG. 2) that is carried out by components of the system controller 112 (e.g., the servo processor 116 and one or more banks of the memory 118). In operation, the read/write heads 104A and 104B read the positioning data from servo sectors stored on the magnetic recording media 106. The read positioning data is processed to determine an actual position 128 (shown in FIG. 2) of the read/write heads 104A and 104B relative to tracks on the magnetic recording media 106.

Figure 2:
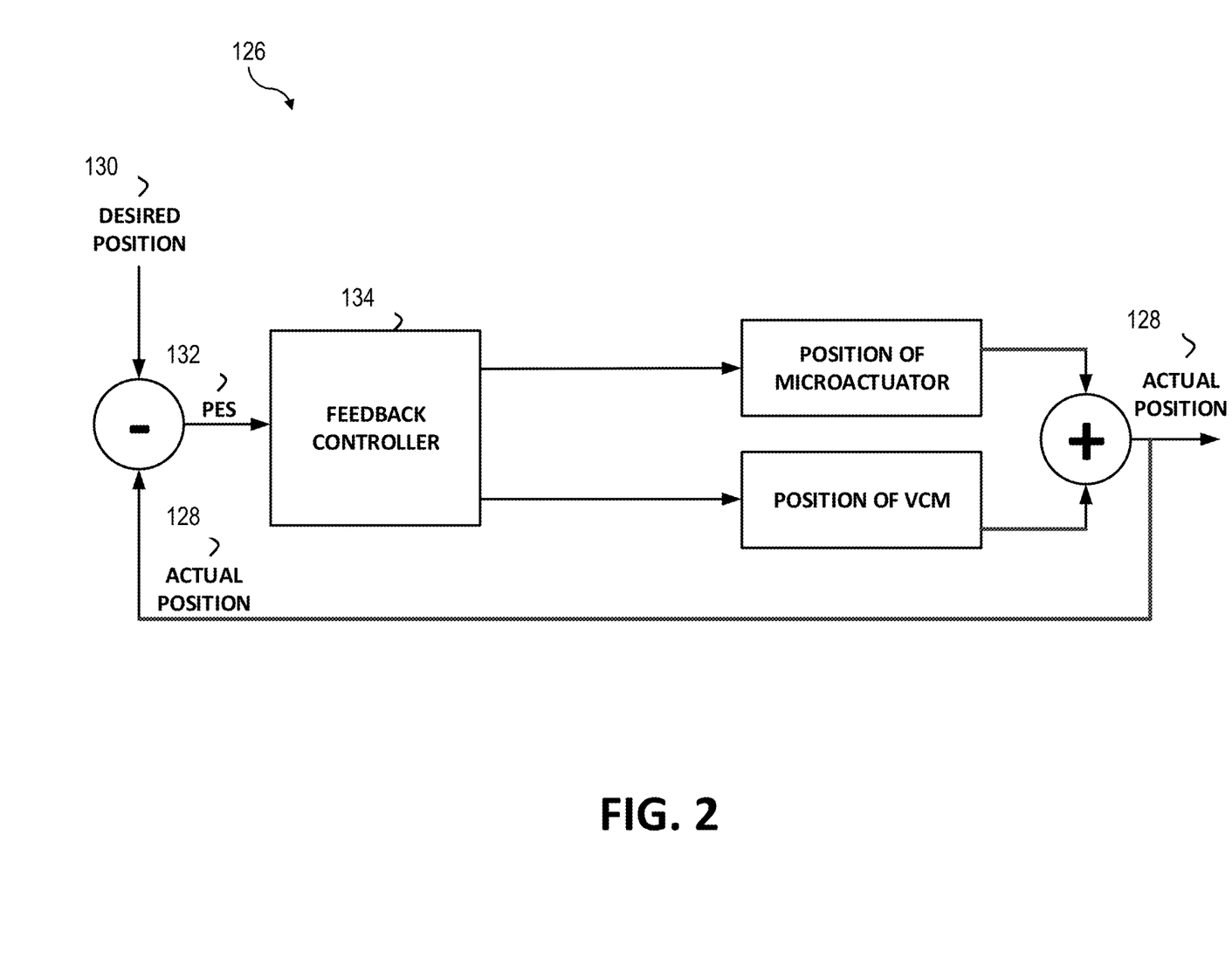
FIG. 2 shows a diagram of a servo control system, in accordance with certain embodiments of the present disclosure.

The actual position 128 of the read/write heads 104A and 104B is subtracted from a desired position 130 of the read/write heads 104A and 104B to determine a position error signal (PES) 132, which is the difference between where the read/write heads 104A and 104B are and should be positioned. The PES 132 is fed into a feedback controller 134, which controls current to at least one of the voice coil motor (VCM) assemblies 136A, 136B and—for some operations—controls voltage to microactuators to position the read/write heads 104A and 104B over the desired track. This PES is generated from reading data in the servo sectors as opposed to reading data in the data sectors.

As shown in FIG. 1, the data storage device 100 includes a power supply 138, (e.g., an amplifier) which is controlled by the system controller 112. The power supply 138 supplies current to a motor 140 (e.g., spindle motor), which rotates the magnetic recording media 106. The power supply 136 also supplies current to VCM assemblies 136A and 136B. In certain embodiments, the power supply 138 is an integrated circuit, which includes electronics (e.g., voice coil driver electronics) designed to provide current to the VCM assemblies 136A and 136B.

The VCM assemblies 136A and 136B are used to position (e.g., rotate) the actuators 102A and 102B to position the read/write heads 104A and 104B over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 138 and applied to the voice coil of the respective VCM assemblies 136A and 136B to rotate the respective actuators 102A and 102B (and therefore the respective read/write heads 104A and 104B) towards the desired data track. The applied current through the coil generates a magnetic field that interacts with magnets of the VCM assemblies 136A and 136B. The applied current may follow a current profile determined by and commanded by the servo processor 116. As the respective read/write heads 104A and 104B near the desired data track, less current is applied to the VCM assemblies 136A and 136B such that the read/write heads 104A and 104B begin to settle over the desired data track (i.e., a track-settling operation). Once the respective read/write heads 104A and 104B are positioned over the desired data track, the servo control system 126 compensates for small positioning errors (i.e., a track-follow operation) to keep the desired read/write heads 104A and 104B over the desired data tracks on the magnetic recording medium 106 during a read operation or a write operation.

Figure 3:
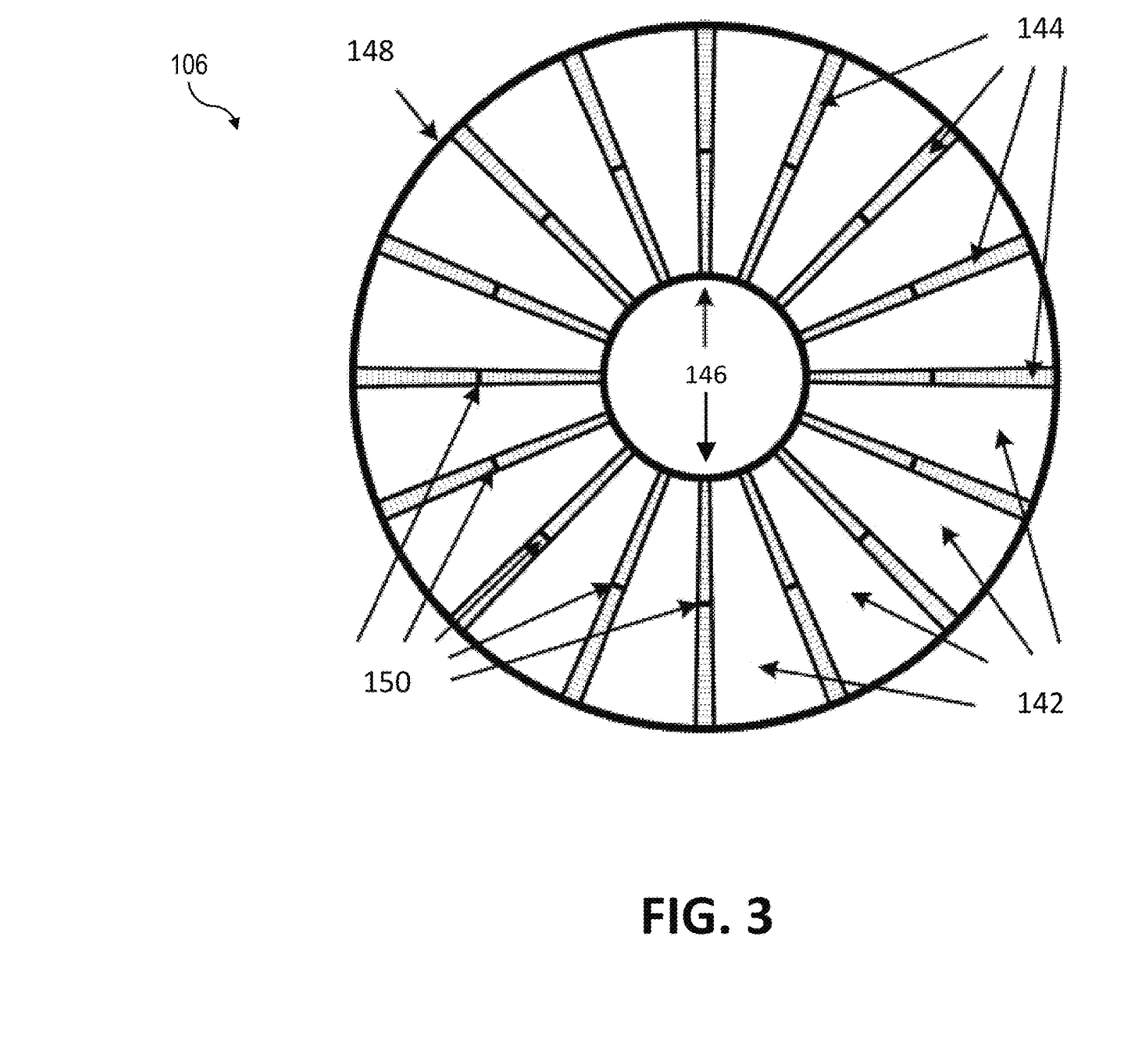
FIG. 3 shows a magnetic recording medium, in accordance with certain embodiments of the present disclosure.

FIG. 3 shows a top view of one side of one of the magnetic recording media 106. Data is written to the magnetic recording medium 106 along tracks, which may be sequentially numbered in accordance with their radial position. For example, track zero may be located adjacent to an outer diameter of the magnetic recording medium 106 and a last track may be located adjacent to an inner diameter of the magnetic recording medium 106.

The tracks of the magnetic recording medium 106 can include user data regions 142 and servo data regions 144 (which are sometimes referred to as servo wedges) positioned between the user data regions 142. The servo wedges 144 extend radially between an inner diameter 146 and an outer diameter 148 of the magnetic recording medium 106. Data on the magnetic recording media 106 is stored on data tracks which extend circumferentially around the top/bottom surfaces of each magnetic recording medium 106. The portion of the data tracks in the user data regions 142 store user data, and the portion of the data tracks in the servo wedges 144 are comprised of individual servo sectors 150 (some of which are shaded in FIG. 3), which store servo data. As such, each servo wedge 144 includes a plurality of servo sectors 150. As shown in FIG. 3, the servo wedges 144 can be positioned at regular intervals around the magnetic recording medium 106. In some embodiments, the magnetic recording medium 106 may have on the order of hundreds (e.g., 200) of servo wedges 144.

Figure 4:
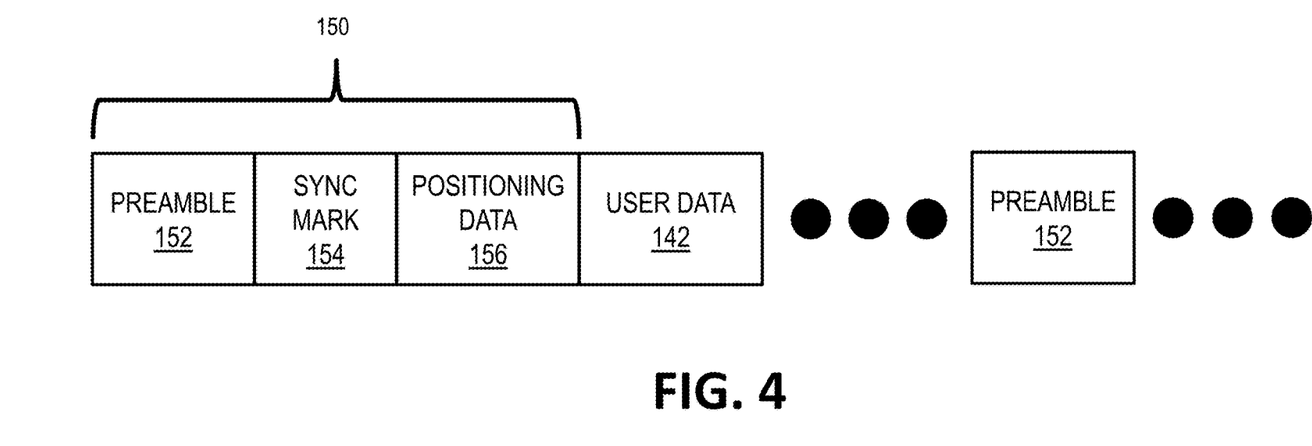
FIGS. 4 and 5 show partial, ribbon schematics of a data track, in accordance with certain embodiments of the present disclosure.

FIG. 4 shows an example of the type of servo data stored to the servo sectors 150. The servo sectors 150 can include a preamble 152 (e.g., a fixed pattern indicating the beginning of the servo sector 150) followed by what may be referred to as a sync mark 154 (e.g., a synchronization pattern) or a servo timing mark. For example, the preamble 152 may be written with an alternating pattern of magnetic transitions which, when read, generates a sine-wave like read-back signal. When the servo control system identifies the preamble 152, the servo control system may then search for an expected sync mark 154. Once the sync mark 154 is detected, the servo control system can then read positioning data 156 following the sync mark 154 from the servo sectors 150. The positioning data 156 specifies the physical radial and tangential location of the given servo sector 150 on the magnetic recording medium 106. As the read/write heads 104A and 104B pass over each servo sector 150, the servo sector's information is demodulated such that the position of the read/write heads 104A and 104B is known. The detected actual position of the read/write heads 104A and 104B is used by the servo controller 126 to determine and correct when the actual position is suboptimal.

Servo data is written to both sides of the magnetic recording medium 106 by, for example, a servo writer or disk writer before the magnetic recording medium 106 is installed in the data storage device 100 or by the data storage device 100 itself using a process referred to as self-servo track writing (SSW) or concentric SSW process. SSW may include using the electronics (e.g., the SOC 110) of the data storage device 100 to write the concentric servo sectors independent of an external servo writer.

The read/write channels 120A and 120B, the preamplifiers 124A and 124B, and various components of the system controller 112 operate so that the servo data read by the read/write heads 104A and 104B can be processed and used by the data storage device 100 to maintain proper positioning of the read/write heads 104A and 104B.

Figure 5:
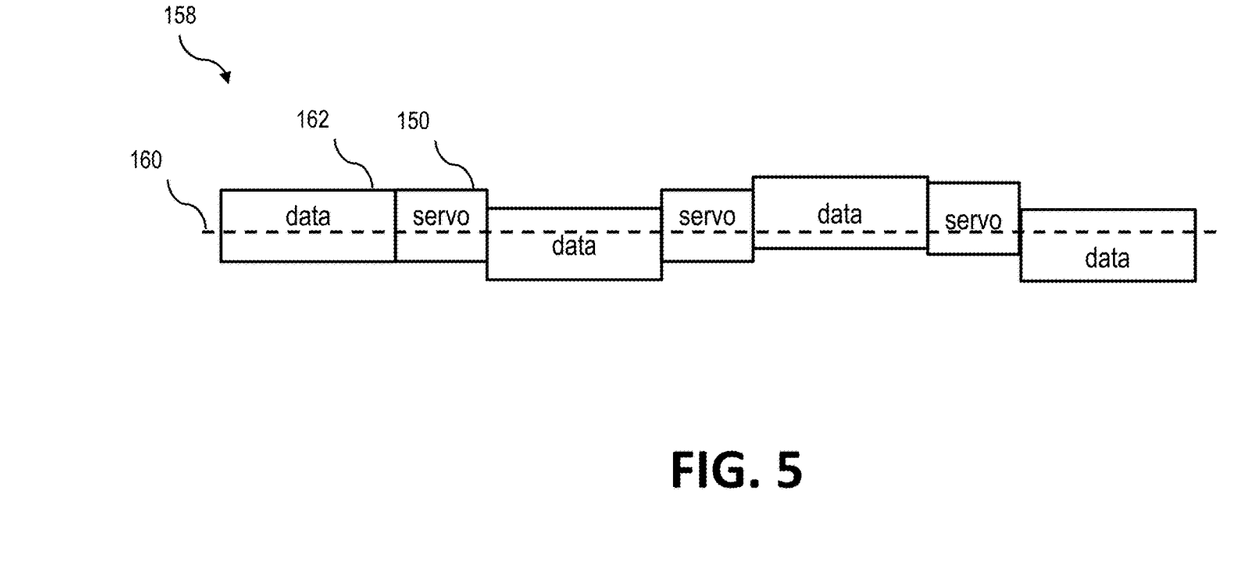

FIG. 5 shows a partial, ribbon view of a data track 158 for the magnetic recording medium 106. The magnetic recording medium 106 may have millions of data tracks stored on it. The data track 158 has a centerline 160. In some embodiments, the centerline 160 is the average centerline of data sectors along the data track 158. The data track 158 includes data sectors 162 positioned between the servo sectors 150. Many data sectors 162 can be positioned along the data track 158 in the section with the user data 142 (shown in FIGS. 3 and 4). As such, there can be multiple distinct data sectors 162 (e.g., data sectors with unique addresses) positioned between the servo sectors 150 along the data track 158.

As shown in FIG. 5, at least some of the data sectors 162 and servo sectors 150 may be offset (e.g., radially offset) from the centerline 160 of each data track 158. For example, the centerline of a given sector may be offset from (e.g., not aligned with) the centerline 160 of the data track 158. As noted above, the misalignment may cause errors when attempting to read data from the misaligned data sectors 162.

Figure 6:
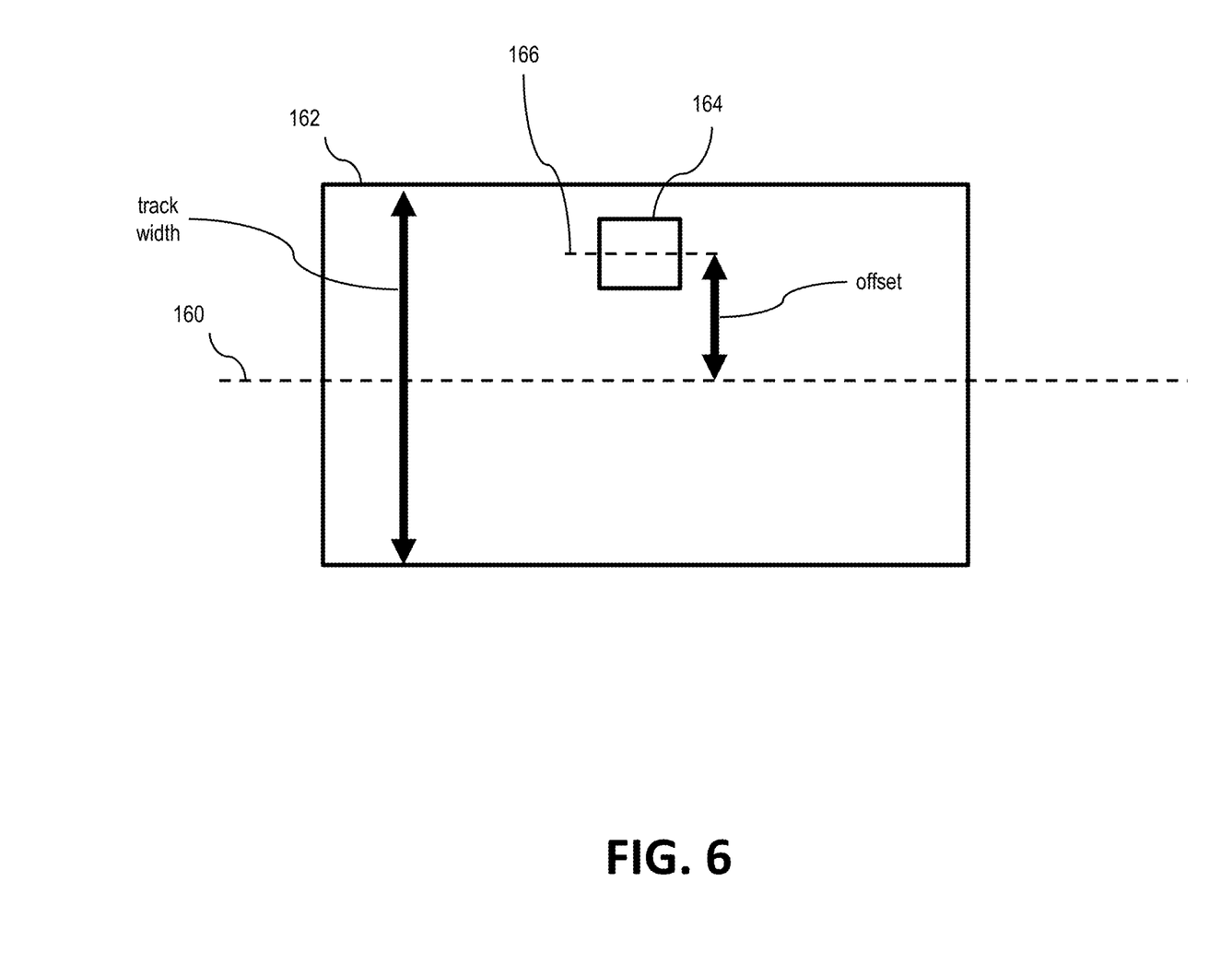
FIG. 6 shows a data sector and a read head, in accordance with certain embodiments of the present disclosure.

FIG. 6 shows one data sector 162 with a read head 164 (e.g., reader, transducer) positioned over the data sector 162. The read head 164 has its own centerline 166. When the read head 164 passes over the data sector 162 while its centerline 166 is offset from a centerline 160 of the data sector 162, there is an increased risk of a read error occurring than if the centerlines 160 and 166 where aligned with each other. The risk of a read error increases the further the centerlines 160 and 166 are offset from each other. If the read head 164 attempts to follow the centerline 160 of the data track but the data sector 162 itself is misaligned or offset from the centerline 160, the read head 164 will be misaligned or offset with the centerline of the given data sector 162.

Further complicating reading and writing is the fact that the read head and write head (e.g., writer, transducer) are physically separate and therefore physically offset from each other. As a result, there is some natural misalignment between data being written on one data track and the servo data being read from another data track.

Figure 7:
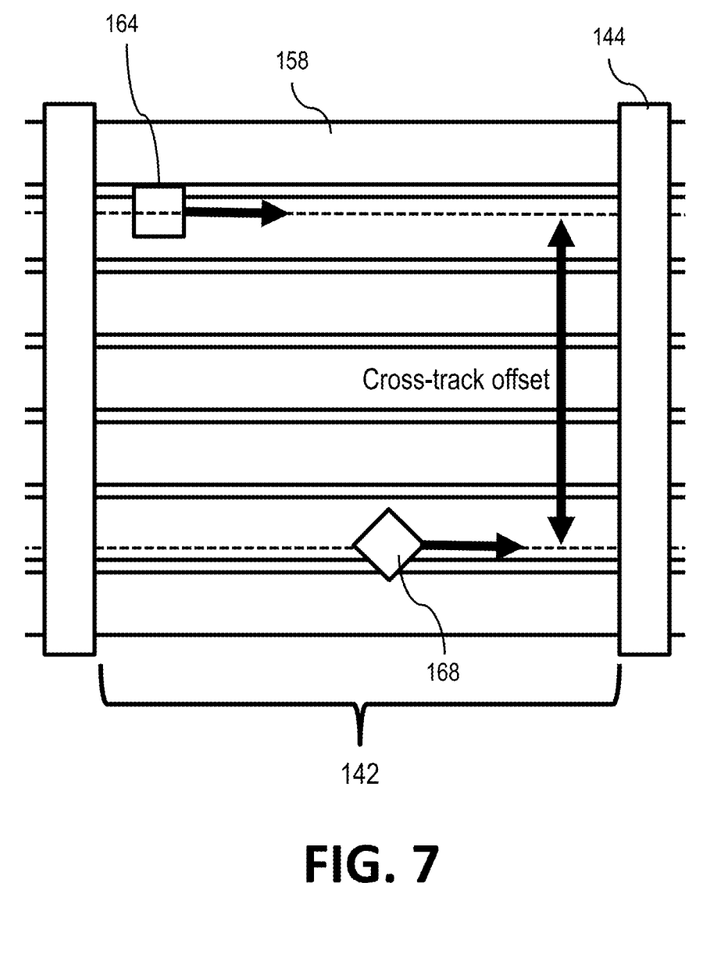
FIG. 7 shows multiple data tracks, a read head, and a write head, in accordance with certain embodiments of the present disclosure.

FIG. 7 shows an example of the physical offset between the read head 164 and a write head 168. The read head 164 and the write head 168 are offset from each other in a cross-track direction (e.g., radially with respect to the magnetic recording medium 106) and an on-track direction (e.g., circumferentially). For example, the read head 164 may be offset from the write head 168 by multiple data track widths. As a result, the read head 164 reads servo data from one data track while the write head 168 is positioned over another data track. This offset can cause the write head 168 to write data sectors that are offset from the centerline of the data track. And, the offset is not detected until the read head 164 attempts to read the written data. Therefore, hard disk drives can apply various techniques to compensate for data sectors written off-center or offset from the centerline of its data track.

Figure 8:
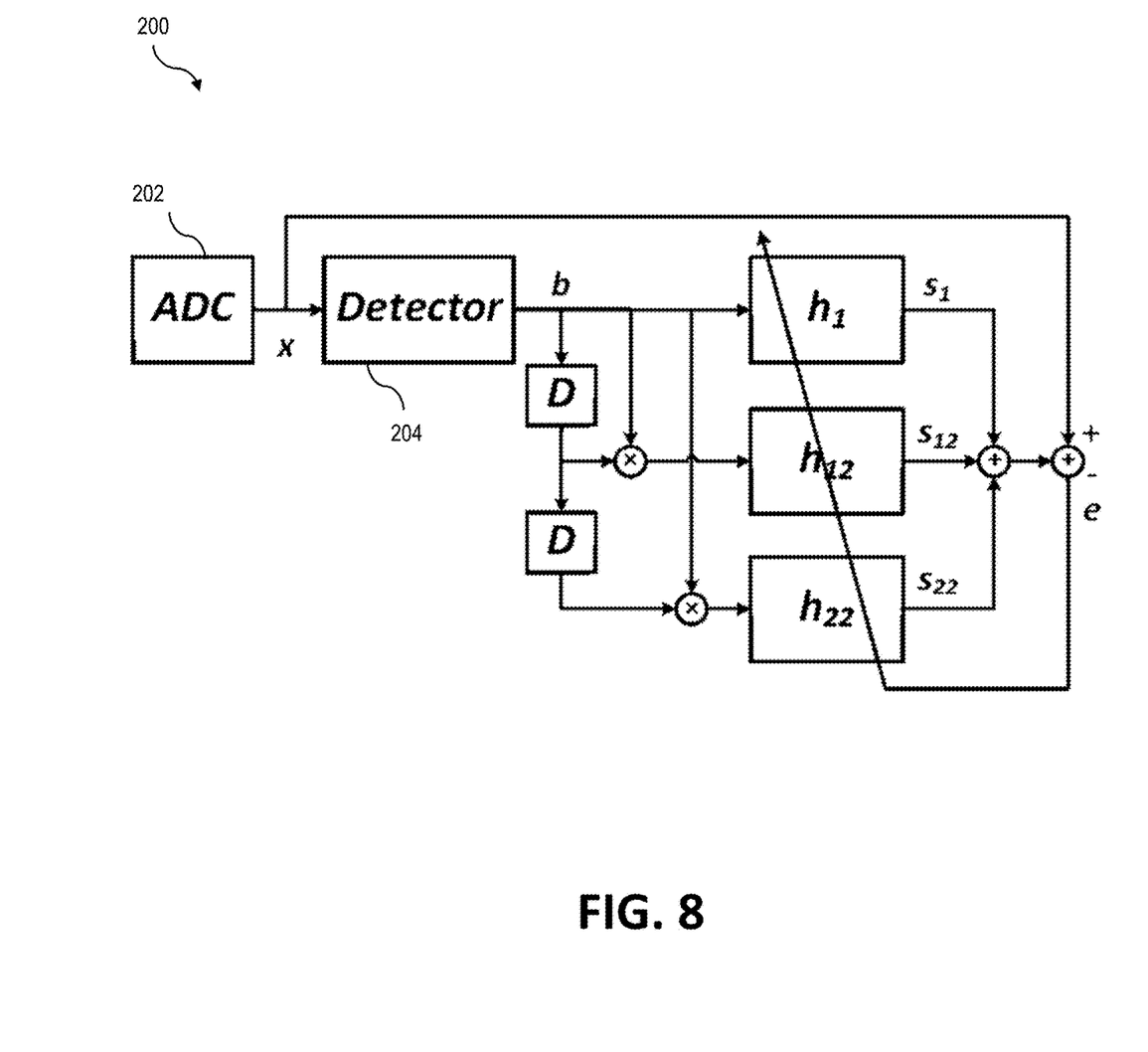
FIG. 8 shows a schematic of an approach for using PES to calculate a proxy value for read offset, in accordance with certain embodiments of the present disclosure.

FIG. 8 shows a schematic 200 that demonstrates an approach for using PES to calculate proxy values for read offsets (e.g., offset or misaligned data sectors along a data track). In short, the proxy value is extracted from PES and used to determine an offset direction and/or an offset amount. In the discussion below, the proxy value is represented by beta (β). In certain embodiments, the PES is generated from reading (or attempting to read) data sectors 162 as opposed to servo sectors 150.

PES can be generated by utilizing finite length Volterra series representation of the read signals. FIG. 8 demonstrates how 1st and 2nd order Volterra kernel coefficients can be extracted from samples of a read signal. Samples of the read signal are first processed by the analog-to-digital converter (ADC) 202 and sent to a detector 204. U.S. Pat. No. 7,885,025 describes calculating PES by utilizing finite length Volterra series representation of the read signals and is hereby incorporated by reference for that purpose.

Assuming a system with memory length of K, the coefficients of the 1st order kernel $h_1$ can be represented by $s_1^1$, $s_2^1, s_3^1, \ldots, s_K^1$, and the coefficients of the 2nd order kernels $h_{12}$ and $h_{22}$ can be represented by $s_1^{12}, s_2^{12}, s_3^{12}, \ldots, s_K^{12}$ and $s_1^{22}, s_2^{22}, s_3^{22}, \ldots, s_K^{22}$, respectively. The amplitude of the PES generated from these kernel coefficients contains information about the read offset. More specifically, the sum of the 2nd order coefficients, beta β, defined as follows is proportional to the read offset value:

$$\beta = \sum_{i=1}^{K} \left( s_i^{12} + s_i^{22} \right) \tag{1}$$

However, due to head-to-head variation, a reference value should be used in conjunction with the calculated β value to estimate read offset for a given missed or failed data sector. Note that each data sector can have its own β value. The reference value can be set as the β value at a nominal read location (e.g., the β value along the centerline of the data track).

The nominal read location can be calculated on-the-fly and on a per-read-head and per-data-track basis. In embodiments described below, the nominal read location (e.g., the above-noted reference value) is referred to as $\beta_{track}$. This $\beta_{track}$ value is the average value of β for the data sectors of a given data track and is represented as follows:

$$\beta_{track} = \frac{1}{N} \sum_{s=1}^{N} \beta_{sector}^{(s,r_s)} \qquad (2)$$

where $r_s$ represents the read offset deviation from an optimal location for sector s and $\beta_{sector}^{(s,r_s)}$ r represents the β value of sectors with read offset set $r_s$. Because the servo control system attempts to position read heads at the optimal location along data tracks, the average β value (e.g., $\beta_{track}$) can estimate the reference β value at the optimal read location (e.g., with zero offset) for the current read head and data track.

In certain embodiments, instead of immediately stopping a read operation upon detecting an error, an entire data track can be read continuously regardless of whether a failed data sector is detected. As the data track is read, the $\beta_{track}$ value can be calculated—regardless of whether a failed data sector is detected—such that it is ready to be used for error recovery.

Figure 9:
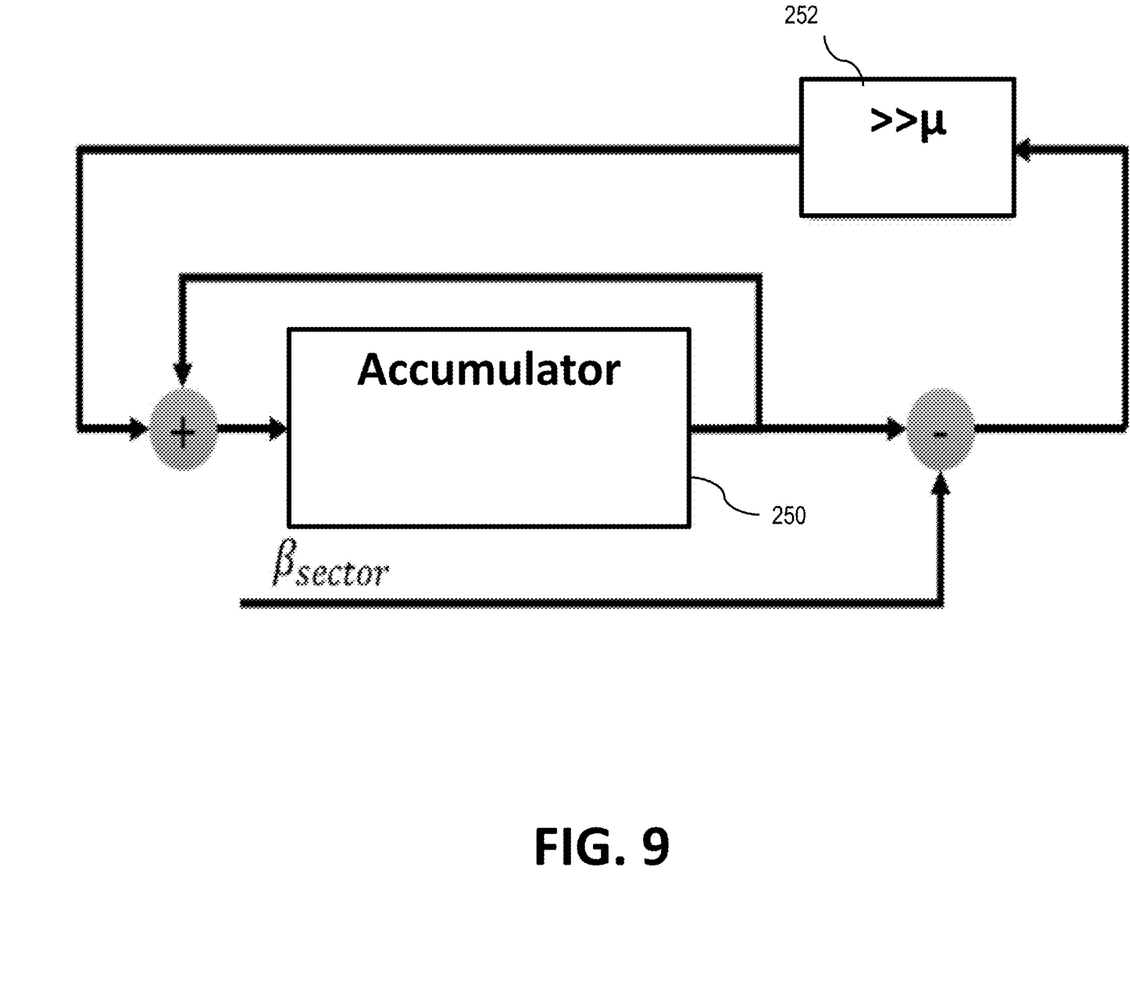
FIG. 9 shows a schematic of an approach for calculating on-the-fly, in accordance with certain embodiments of the present disclosure.

Using one approach, the $\beta_{track}$ value can be continuous updated/adapted while the read head is sensing (e.g., reading) data from data sectors along the data track. This approach is outlined in FIG. 9. An accumulator 250 starts with the β value of the first read data sector on the current data track. When the β value of a newly read data sector ($\beta_{sector}$) is available, the weighted version (determined by block μ 252) of the difference between/sector and the current accumulator value is used to update the accumulator 250. In another approach, the β values of all the data sectors within the data track are stored and then averaged at the end by applying equation (2) above. In certain embodiments, only a subset of all the data sectors of a given data track are read to generate the $\beta_{track}$ value.

If one or more data sectors are missed (e.g., a data sector fails to decode), an error recovery process is initiated to attempt to recover data from the missed data sector(s). The β values of failed data sectors are stored in memory and associated with the address of the failed sectors during the read operation. Additionally, the β values of the successfully read data sectors could also be stored in memory to provide additional help in recovering the failed sectors. It has been found that, due to the relationship between β values and read offsets, comparing the β value of the failed data sector (denoted as $\beta_f$) and $\beta_{track}$ indicates the direction where the read head should move to approach the optimal read location. More specifically, if $\beta_f > \beta_{track}$, the read head should be adjusted towards a negative direction (e.g., closer to the inner diameter of the magnetic recording medium), whereas if $\beta_f < \beta_{track}$ the opposite is true.

Figure 10:
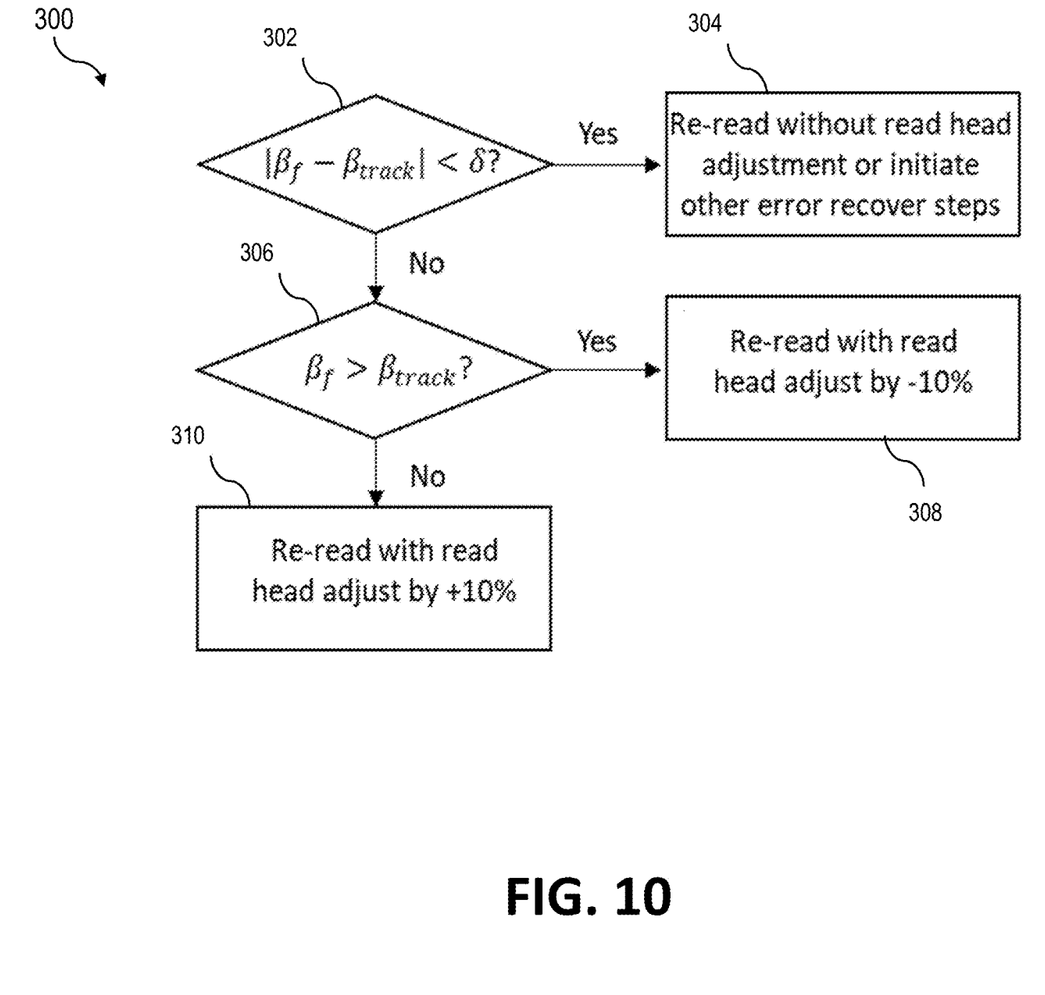
FIGS. 10-12 show various flowcharts of methods, in accordance with certain embodiments of the present disclosure.

FIG. 10 outlines an error recovery process 300 that can be carried out when an error is detected. As noted above, the $\beta_{track}$ value can be calculated based on the data sectors of the data track read by the read head. Data sectors that are not successfully read can be identified and their $\beta_f$ value can be calculated.

In block 302, the difference between the $\beta_{track}$ value and the $\beta_f$ value is determined and compared to a threshold offset value (denoted as δ in FIG. 10). If the difference is less than the threshold offset value, then the read head can re-read the failed data sectors without attempting to determine a read offset value (block 304 in FIG. 10). If the $\beta_f$ value is less than the threshold, this may indicate that the read error was caused by an issue other than the data sector being mis-aligned such as by non-repeatable noise. In such instances, other error recovery approaches can be attempted.

If the difference is greater than the threshold offset value, it can be determined whether the $\beta_f$ value is greater than or less than the $\beta_{track}$ value (block 306 in FIG. 10). If the $\beta_f$ value is greater than the $\beta_{track}$ value, the position of the read head can be adjusted by a pre-determined negative offset value (block 308 in FIG. 10) and the data track can be re-read at this adjusted position. If the $\beta_f$ value is less than the $\beta_{track}$ value, the position of the read head can be adjusted by a pre-determined positive offset value (block 310 in FIG. 10) and the data track can be re-read at this adjusted position. Although FIG. 10 shows a ±10% predetermined offset, other values such as 5-15% can be used.

Using the method 300 described above, read offset adjustments can be made without necessarily relying on data saved during manufacturing. This is because the reference values (e.g., the $\beta_{track}$ values) and the offset values of the failed data sectors (e.g., the $\beta_f$ values) are calculated on-the-fly without reference to manufacturing data. However, the method 300 uses predetermined offset values (e.g., ±5-15%) to adjust the read head during data track re-reads, and those predetermined offset values may not align with the optimal reading position of each missed data sector.

Figure 11:
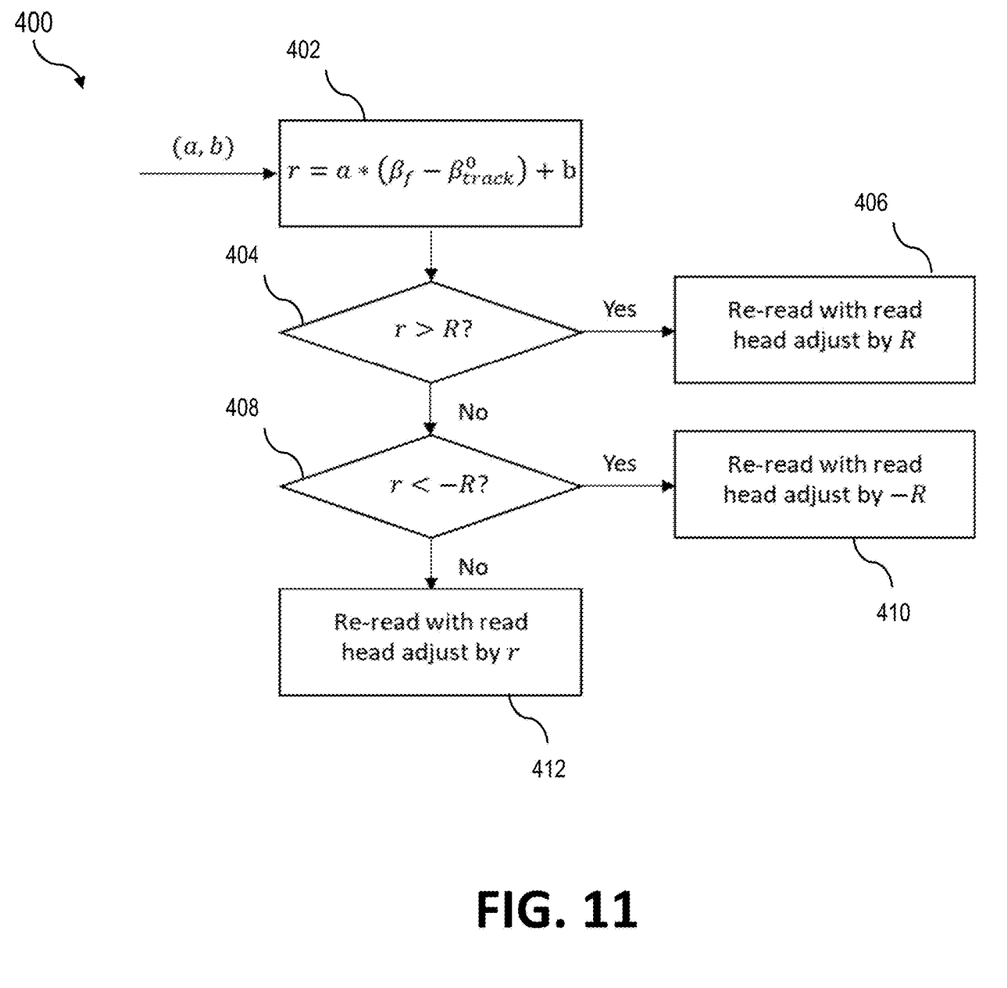

FIG. 11 outlines a method 400 that can be used for more customized adjustments to read heads for re-reading missed data sectors, compared to the method 300 of FIG. 10.

The method 400 involves determining a relationship between the β values and read offset values. In certain embodiments, the relationship is a linear relationship with a slope and an intercept. The relationship (linear or not) can be determined during the manufacturing process by calculating the β values at known read offset values. Equation 3 outlines an approach for calculating β values at given read offsets r, denoted as:

$$\beta_{track}^r = \frac{1}{N} \sum_{s=1}^{N} \beta_{sector}^{(s,r)}. \qquad (3)$$

The $\beta_{track}^r$ values can be calculated in the same way as the $\beta_{track}$ noted above. For linear relationships, the relationship between the β values and read offsets r can be defined by $$r = a*\beta + b, \qquad (4)$$

where a and b are, respectively, a slope and intercept of the linear relationship.

During an error recovery process, once a failed data sector's $\beta_f$ value is available, the estimated read offset value for that failed data sector can be calculated by $a*\beta_f + b$.

Because there is head-to-head variations and zone-by-zone variations, the slope and intercept, a and b, could be calculated on a per-head and a per-zone basis and stored to memory. However, it has been found that, for a given read head, the b value has a non-negligible zone-to-zone variation while a remains relatively stable. In other words, the linear regression models for different zones can be consolidated to one with an intercept offset that various from zone to zone. More specifically, the $\beta_{track}^r$ values can be offset by $\beta_{track}^0$.

The linear regression model can then be derived with pairs (r, $\beta_{track}^r - \beta_{track}^0$) instead of (r, $\beta_{track}^r$). Data points (r, $\beta_{track}^{r,z} - \beta_{track}^{0,z}$) are collected for all r∈ℜ and z∈Z, where Z={$z_1, z_2, \ldots, z_M$} denote a chosen set of zones. The linear regression model can be derived from such set of data points, and a single set of (a, b) can be used for all zones for a given read head. During error recovery, the failed sector $\beta_f$ also should be offset by $\beta_{track}^0$ before being plugged into the linear equation for the estimation. The estimated read offset is therefore given by:

$$(a*(\beta_f-\beta_{track}^0)+b). \qquad (5)$$

In other embodiments, a universal (a, b) across zones can be derived using linear regression models individually for different zones which would yield $(a_z, b_z)$ for all $z \in Z$. The universal (a, b) can be calculated by $$a = \frac{1}{M}\sum_{i=1}^{M} a_z$$

and $$b = \frac{1}{M}\sum_{i=1}^{M} b_z.$$

FIG. 11 shows a method 400 for estimating read offsets using the linear regression models discussed above. The read offset, r, is calculated using Equation 5 noted above (block 402 in FIG. 11). The slope and intercepts used to calculate the read offset are based on the linear regression models calculated during manufacturing the given hard disk drive.

Next, the calculated read offset value is compared to R, which is a predetermined maximum read offset value permitted by the hard disk drive (block 404 in FIG. 11). If the calculated read offset value is greater than the predetermined maximum read offset value, then the read head is adjusted by the maximum read offset value instead of the calculated read offset value (block 406 in FIG. 11). If the calculated read offset value is less than the predetermined maximum read offset value, the calculated read offset value is compared to a predetermined minimum read offset value (block 408 in FIG. 11).

If the calculated read offset value is less than the predetermined minimum read offset value, then the read head is adjusted by the minimum read offset value instead of the calculated read offset value (block 410 in FIG. 11). If the calculated read offset value is greater than the predetermined minimum read offset value, then the read head is adjusted by the calculated read offset value (block 412 in FIG. 11).

Figure 12:
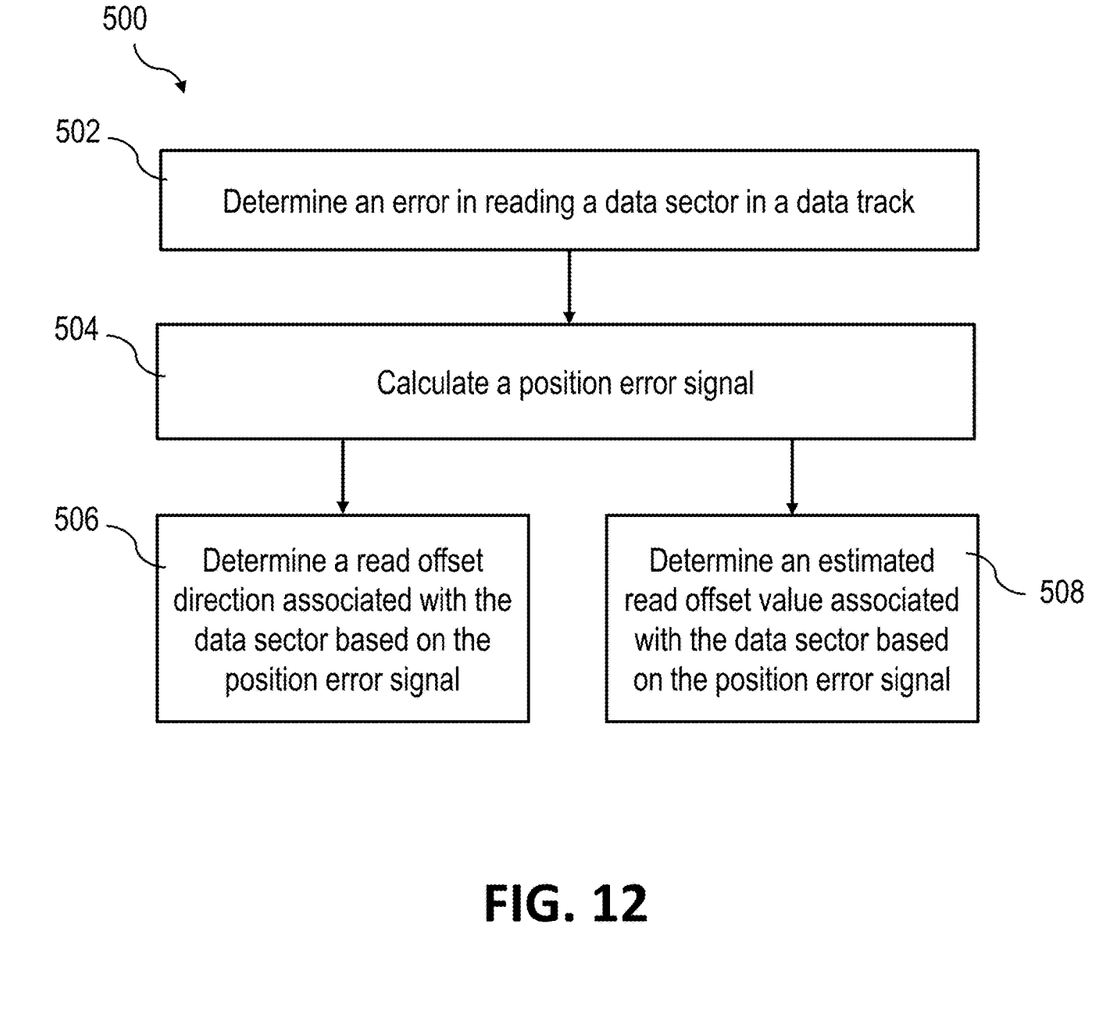

FIG. 12 outlines a method 500 for recovering data from missed data sectors. The method 500 includes determining an error in reading a data sector in a data track (block 502 in FIG. 12). The method further includes calculating a position error signal (block 504 in FIG. 12). In some embodiments, the calculated positioned error is used to determine a read offset direction associated with the data sector (block 506 in FIG. 12). In other embodiments, the calculated positioned error is used to determine an estimated read offset value associated the data sector (block 508 in FIG. 12).

The various processes described above can be carried out by the SOC 110 (shown in FIG. 1). More specifically, calculating the various $\beta$ values can be carried out by the read/write channel 120A or 120B associated with the read/write head 104A or 104B being used to read data from the magnetic recording medium 106. As noted above, the $\beta$ values can be considered to be read offset proxy values and can be calculated on a data sector-by-sector basis and compared to an average $\beta$ value for that data track. In certain embodiments, the average $\beta$ value can be done on a wedge-by-wedge basis. For example, an average $\beta$ value may be calculated for each section of user data 142 along a data track. Instead of stopping a read command when an error is detected, the remaining data sectors can be read such that more $\beta$ values can be calculated (and averaged) and potentially other failed data sectors can be detected.

Although the disclosure above focuses on on-the-fly calculations of $\beta$ value values, the $\beta$ values can be calculated during manufacturing of hard disk drives. For example, the $\beta$ values of multiple data sectors can be measured multiple times while the read head is set at an optimal or near-optimal location. The $\beta$ values can then be averaged to remove noise. This calculation can be done on a per-head and per-zone basis and then stored in a system file in memory.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   determining errors in reading data sectors in a data track;
   calculating read offset proxy values of the data sectors associated with an error based, at least in part, on a position error signal;
   calculating an average of the read offset proxy values of the data sectors of the data track; and
   determining an estimated read offset value for the data sectors associated with the error based, at least in part, on comparing the read offset proxy values with the average of the read offset proxy values.

2. The method of claim 1, wherein the read offset proxy value comprises a kernel coefficient.

3. The method of claim 1, further comprising:
   adjusting a radial position of a read head in response to a determined read offset direction; and
   rereading the data track after the adjusting the radial position.

4. The method of claim 3, wherein the adjusting the radial position comprises adjusting the radial position of the read head a predetermined amount.

5. The method of claim 4, wherein the predetermined amount is 10%.

6. The method of claim 3, wherein the determined read offset direction is determined based on whether a given read offset proxy value is greater or less than the average of the read offset proxy values.

7. A hard disk drive comprising:
   a magnetic recording medium comprising data sectors along a data track;
   a read head arranged to read data from the data sectors; and
   an integrated circuit including circuitry programmed to:
     detect a read error associated with certain of the data sectors,
     after the detection of the read error, continue to read data from the data sectors, and
     cause adjustment of a radial position of the read head in response to a determined read offset direction that is based on whether respective read offset values of the certain data sectors are greater or less than a reference value for the data track.

8. The hard disk drive of claim 7, wherein the circuitry is further programmed to:
cause adjustment of the read head in the read offset direction before rereading the certain data sectors associated with the read error.

9. The hard disk drive of claim 8, wherein the adjustment is a predetermined amount.

10. The hard disk drive of claim 9, wherein the predetermined amount is 10%.

11. The hard disk drive of claim 7, wherein the reference value is an average of read offset proxy values of the data track.

12. A system-on-a-chip (SOC) comprising:
a read/write channel configured to:
  calculate a read offset proxy value for each data sector of a data track,
  detect an error in reading a first data sector of the data sectors,
  calculate a reference value for the data track based on an average of calculated read offset proxy values, and
  compare the reference value to the read offset proxy value associated with the first data sector; and
a servo controller configured to:
  cause adjustment of a position of a read head in response to the comparison.

13. The SOC of claim 12, wherein the adjustment is a pre-determined value.

14. The SOC of claim 13, wherein the pre-determined value is 10%.

15. The SOC of claim 12, wherein the read/write channel is further configured to determine an offset direction in response to the comparison, wherein the servo controller is further configured to cause adjustment of the position of the read head in the offset direction.

16. The SOC of claim 15, wherein the offset direction is determined based on whether a given read offset proxy value is greater or less than the reference value.

17. The SOC of claim 12, wherein the adjustment is performed before the first data sector is reread.

18. The SOC of claim 12, wherein the read offset proxy value comprises a kernel coefficient.

19. The SOC of claim 12, wherein the read offset proxy value is extracted from a position error signal.

20. The SOC of claim 12, wherein the read/write channel and the servo controller are separate modules on the SOC.

* * * * *